United States Patent [19]

Parsons

[11] 4,347,574

[45] Aug. 31, 1982

[54] METHOD OF AND APPARATUS FOR DETERMINING WITH PRECISION THE PAYLOAD OF A WATER BORNE VESSEL

[76] Inventor: Ward H. Parsons, 1202 Green Glen Rd., Birmingham, Ala. 35216

[21] Appl. No.: 166,362

[22] Filed: Jul. 7, 1980

Related U.S. Application Data

[63] Continuation-in-part of Ser. No. 950,472, Oct. 11, 1978, abandoned.

[51] Int. Cl.[3] .................... G06F 15/20

[52] U.S. Cl. .................... 364/463; 364/567; 364/466; 177/25

[58] Field of Search .................... 364/463, 466, 567; 73/65, 291, 290 B, 290 R, 302, 149; 177/207, 1, 25, 136

[56] References Cited

U.S. PATENT DOCUMENTS

| | | | |
|---|---|---|---|
| 646,307 | 3/1900 | McCormick | 33/126.5 |
| 954,262 | 4/1910 | Lorenzi | 177/207 |
| 1,031,799 | 7/1912 | Mackay | 73/65 |
| 1,218,525 | 3/1917 | Cole | 73/65 |
| 2,865,566 | 12/1958 | Swenson | 364/463 |
| 3,128,375 | 4/1964 | Grimnes | 73/65 |
| 3,190,119 | 6/1965 | Isobe et al. | 73/302 |
| 3,296,863 | 1/1967 | Levine | 73/65 |
| 3,329,808 | 7/1967 | Fisher | 364/463 |
| 3,334,608 | 8/1967 | Nemoto et al. | 73/65 |
| 3,408,487 | 10/1968 | Wilde | 364/463 |

FOREIGN PATENT DOCUMENTS

| | | | |
|---|---|---|---|
| 52-52344 | 4/1977 | Japan | 364/463 |
| 832421 | 4/1960 | United Kingdom | 364/463 |

*Primary Examiner*—Mark E. Nusbaum
*Assistant Examiner*—Gary Chin
*Attorney, Agent, or Firm*—B. P. Fishburne, Jr.

[57] ABSTRACT

The total weight of material loaded into a floating barge is determined with high accuracy automatically. Human and other error factors are eliminated. Before and after loading, the angle of list of the barge in the port-starboard plane and the angle of trim in the fore-aft plane, together with the distance from the water surface to a fixed overhead structure and the distance from this structure to a fixed point on the barge deck are measured. Using the known barge geometry and the above measurements before and after loading, a computer calculates the change in the volume of water displaced due to loading the barge and by using Archimedes' principle and then calculates the payload introduced into the barge.

2 Claims, 7 Drawing Figures

METHOD OF AND APPARATUS FOR DETERMINING WITH PRECISION THE PAYLOAD OF A WATER BORNE VESSEL

CROSS-REFERENCE TO RELATED APPLICATION

This application is a continuation-in-part of prior copending application Ser. No. 950,472, filed Oct. 11, 1978 now abandoned, for Method of and Apparatus for Drafting a Water-Borne Vessel.

BACKGROUND OF THE INVENTION

The traditional method of determining the weight of material loaded into a floating vessel, such as a barge, commonly known as "drafting" the vessel, involves the use of range rods or measuring tapes by personnel on the vessel. Usually, measurements are made manually at the corners of the deck to determine the distance from the deck to water level when the vessel is empty and after it has been loaded. The measurements thus obtained are then used in a known mathematical formula to calculate the weight of the payload in the floating vessel.

Inaccuracies arising in the traditional method of drafting vessels include the following:

(1) Because of wave action, the water level is never constant.

(2) Because of water in the hold of the vessel or structural abnormality, the vessel undergoing loading is almost never level in the port-starboard or fore-aft planes before loading or after loading.

(3) Visual drafting of a vessel is subject to variations in the depth perception of personnel and human error in the reading of range rods and measuring tapes, along with other miscalculations.

As a result of the above, large and costly errors are commonly made in calculating the payloads of barges and other vessels by the traditional method. Accordingly, it is the object of this invention to eliminate the deficiencies of the prior art by providing a method and a simple apparatus for automatically determining with high accuracy the weight of any payload introduced into a floating vessel at dockside by means of conventional loading equipment. The invention eliminates human error completely and eliminates or compensates for other error factors which are frequently present, including those enumerated above. Through the invention, the accurate drafting of floating vessels is rendered essentially automatic.

SUMMARY OF THE INVENTION

In accomplishing the stated objectives of the invention, vessel list and trim sensors are attached to the vessel and produce electrical signals, the magnitudes of which are proportional to the angles of list and trim at any given time. The signals produced by the two sensors also take into account the presence of any water in the hold of the vessel or other abnormality causing it to be other than level while floating in the water, either fresh or salt water.

Another apparatus component employed in the method consists of a distance measuring device, such as a tape, attached to a fixed overhead structure at dockside. This tape enables the measurement accurately of two distances, namely, the distance from the fixed overhead structure to water level, and from the structure to a chosen point on the deck of the barge.

These distance measurements and the output signals of the two deck-mounted list and trim sensors constitute the external analog inputs to a computing means forming the remainder of the apparatus. The computing means can compute precisely the payload of material placed in the vessel, taking into account any water which may be in the hold of the vessel and mathematically distributing such water over the entire area of the vessel, as if the water in the hold were of uniform depth over the entire area. The computation accepts the fact that in practice a vessel is almost never level, and the computer automatically computes corrective factors to mathematically level the vessel. Human visual drafting is never relied upon and the load draft is measured accurately by a tape or other accurate instrument from a fixed point above the vessel. All mathematical calculations are by a computer with its inherent accuracy and reliability.

Other features and advantages of the invention will become apparent during the course of the following description.

DETAILED DESCRIPTION

Figure 1:
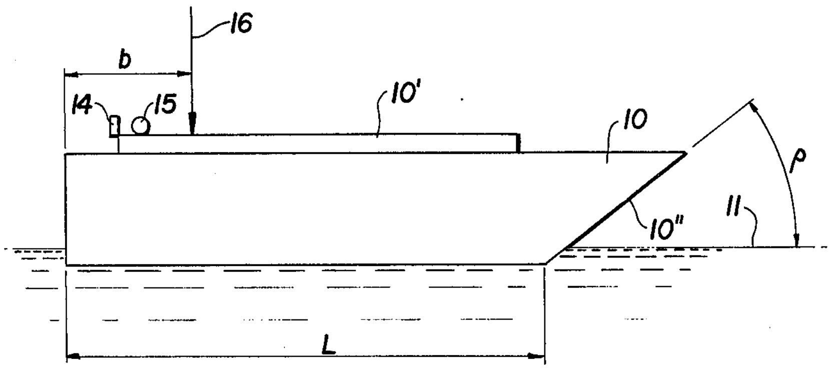
FIG. 1 is a side elevation, partly schematic, of a floating barge, unloaded, and in a level condition.

Referring to the drawings in detail, wherein like numerals designate like parts, the numeral 10 designates a barge having a deck 10' and being in the form generally of a rectangular parallelepiped modified to the extent of having a raked bow 10" defining a rake angle (p). In FIG. 1, the barge is shown floating in an empty state and in a level attitude, as where there is no water in the hold or structural abnormality. In such state, the barge 10 may have a normal empty draft of, say, two feet below the water level 11.

Figure 2:
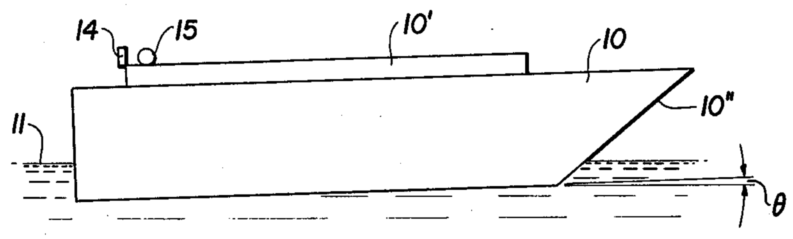
FIG. 2 is a similar view of the barge down by the stern before loading and showing a trim angle.
Figure 3:
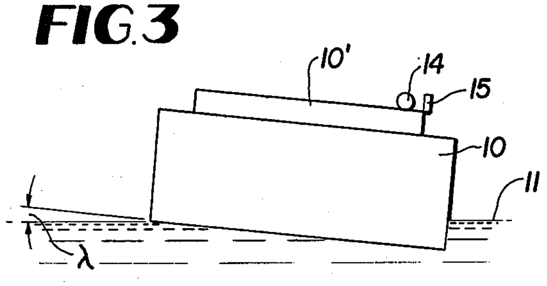
FIG. 3 is an end elevational view of the barge listing in the port-starboard plane and showing a list angle.

FIG. 2 illustrates the barge down by the stern due to water in the hold and showing a trim angle ($\theta$). Similarly, FIG. 3 shows the unloaded barge listing due to water in the hold in the port-starboard plane and showing a list angle ($\lambda$). Although not shown in the drawings, the vessel may be listing before loading in a compound plane due to water in the hold or because of other abnormalities.

Figure 4:
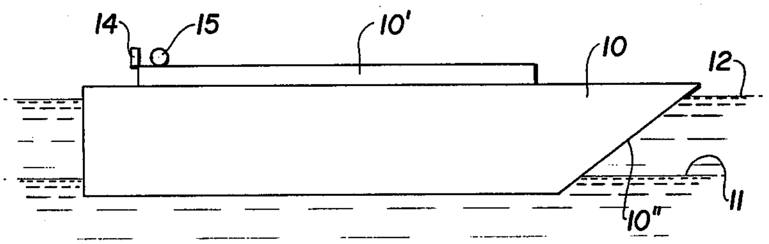
FIG. 4 is a further side elevation of the barge after loading.
Figure 5:
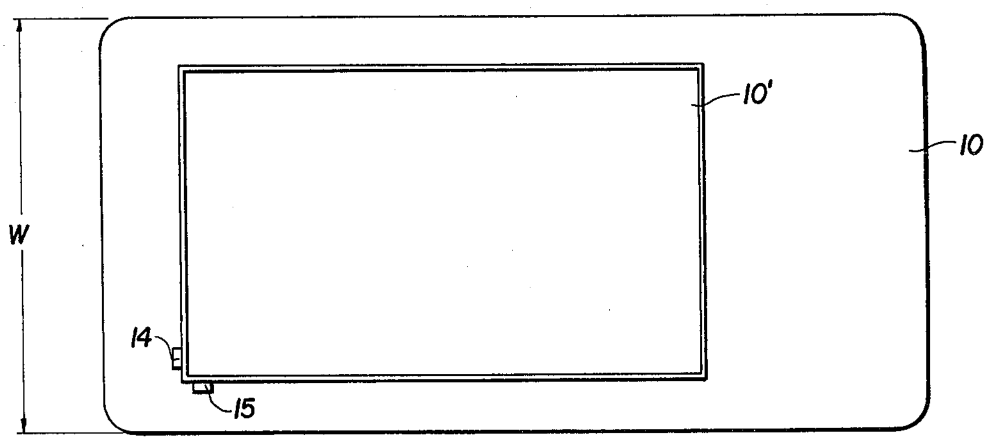
FIG. 5 is a plan view of the barge.

FIG. 4 represents the barge 10 in a loaded state relative to the original water line 11 and showing the new water line 12.

The apparatus employed in the invention comprises a port-starboard pendulum-type list sensor 14 and a fore-to-aft trim sensor 15 fixedly mounted in right angular relationship permanently or temporarily on a normally level structural part of the barge. The two sensors 14 and 15 are preferably of the type manufactured and sold by Honeywell, Minneapolis, Minn., designated Slope Sensor 134847A, or some equivalent means. The sensors 14 and 15 are conventional and need not be described in detail. Each sensor electromagnetically measures any deviation from level in the particular plane in which it is mounted to operate, and produces an electrical signal proportional to the degree of angular deviation from true level in that plane.

Figure 6:
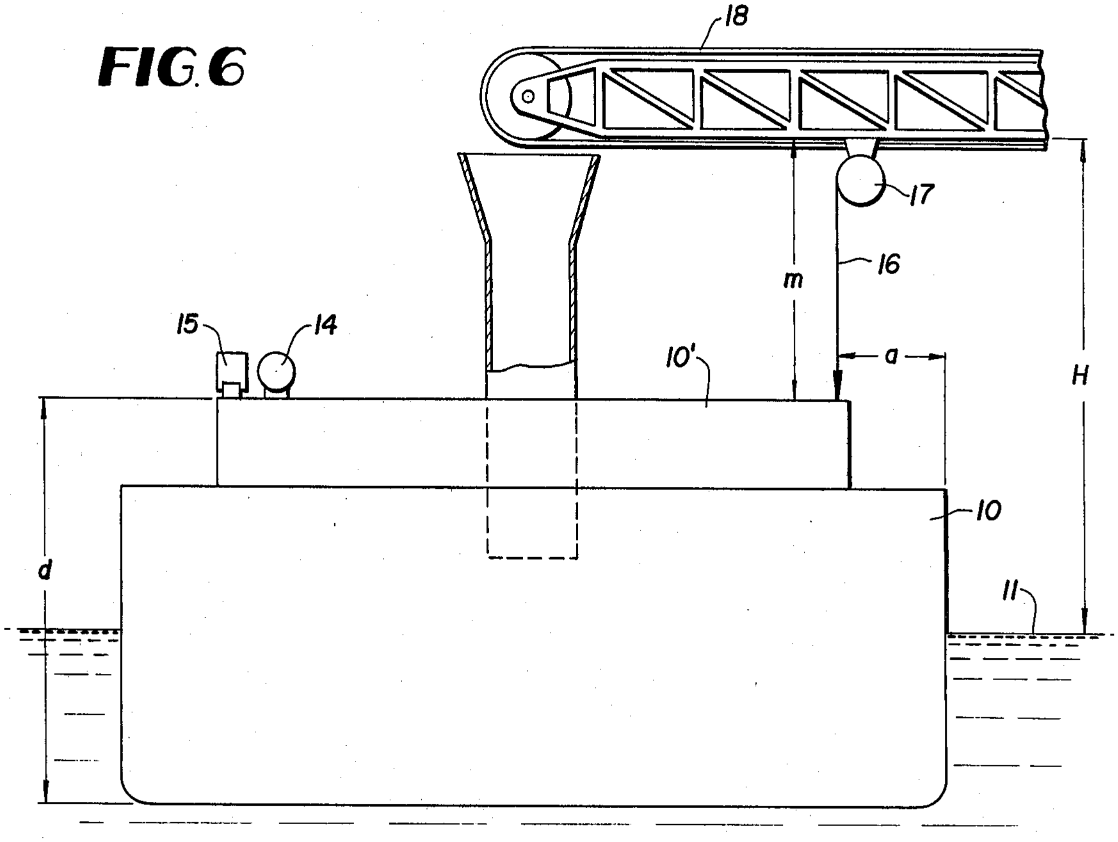
FIG. 6 is a further end elevational view of the barge in relation to fixed overhead loading equipment and a distance measuring device on such equipment.

The apparatus further comprises, FIG. 6, a vertically extensible and retractable distance measuring tape 16 fixed to an overhead support 18, such as a material loading conveyor at dockside whose elevation does not change. As will be further explained, the measuring tape 16 is used to measure the vertical distance from the barge deck 10' to the fixed overhead element 18 before and after the barge is loaded, and these measurements are included in the external analog inputs to the computing means shown in FIG. 7. The point at which the lower end of the tape 16 touches the deck 10' is not critical in the method, as the vessel 10 will either be level in reality or will be theoretically level mathematically by the computing means.

Figure 7:
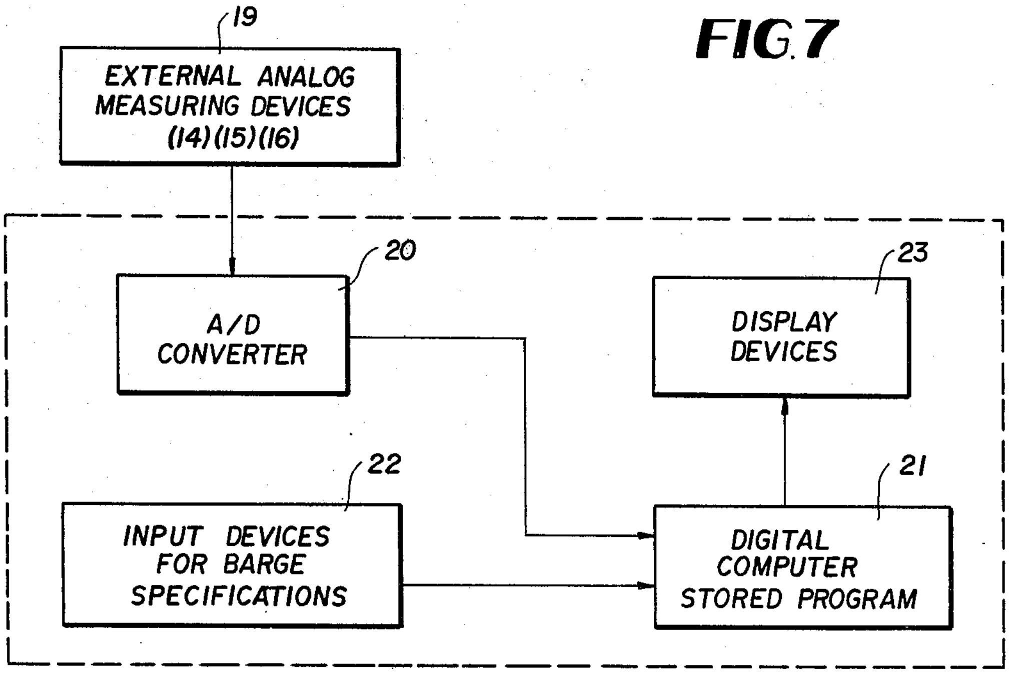
FIG. 7 is a block diagram of computing means.

Referring to FIG. 7 of the drawings, the external analog measuring devices or means within the block 19 consists of the list or slope sensors 14 and 15 and the measuring tape 16. The signals or outputs of these devices are processed through an analog-digital converter 20 and are then stored in designated data registers of a digital computer 21 prior to loading the barge 10.

The barge dimensional and geometric specifications are also entered into the computer 21 for future use in the computation of the payload, as indicated at 22 in FIG. 7. This input data for the computer can be through an operator keyboard, or can be recalled from a file set of data for a standard barge. This data will include the barge height, length, width, and rake angle of the stern, as will be further discussed in the mathematical computation which takes place in the method.

Upon completion of barge loading and upon a signal from the operator of the system, a second set of outputs or readings from the analog devices 14, 15 and 16 will be obtained and stored in the digital computer data registers. The digital computer will then execute its program (annexed as an appendix to this application) and will give an accurate computation of the total payload introduced into the barge by the loading equipment or conveyor 18. The total payload will be displayed on a display device 23, such as a cathode ray tube or a line printer, which elements could also display further information useful in preparing a bill of lading.

The annexed program enables the digital computer to compute the payload introduced into the floating barge 10 of known size and shape. Four barge dimensions and water density are operator input. Two angles and two distance measurements are input as digital data both before loading and after loading. The computation of the payload is then executed by the programmed computer 21. The computer 21 embodies a microprocessor, such as one of the "8080" family which includes a variety of chips available from several manufacturers. Other adaptable microprocessors are the Motorola MC-6800 and MOS Technology MCS-6502 microprocessor chips.

The following mathematical analysis sets forth the nature of the payload computation carried out by the computing means of FIG. 7. The barge 10 of known geometric configuration is to be loaded at dockside while floating in fresh or salt water. Before loading and upon completion of loading, the following measurements are made: the angle of list of the barge in the port-starboard direction, the angle of trim in the fore-aft direction, the distance from the water surface to the stationary horizontal overhead support 18 and the distance from this same support to a fixed point on the barge deck 10'. Using the known barge geometric dimensions and the above measurements before and after loading, a calculation is made of the change in the volume of water displaced due to loading of the barge, and by applying Archimedes' principle, the payload introduced into the barge is computed.

DEFINITION OF SYMBOLS USED IN PROBLEM

Geometry of Barge

The deck, flat bottom and two sides of the barge are assumed to form a rectangular prism which is truncated at a right angle by the stern plane and by an inclined plane at the forward end which forms a rake angle with the flat bottom of the barge.

The physical dimensions of the barge are identified as follows:

d = distance from keel of barge to the deck surface at which measurement from overhead boom is made;

L = length of flat bottom of the barge from stern to point where angled bow plate turns up;

$\rho$ = rake angle of forward end of barge;

w = width of barge from port to starboard.

Measurements Taken before and after Loading

Four measurements are taken before and after loading to determine the change in displacement. These are:

H = distance from water level to fixed overhead horizontal boom;

m = distance from overhead boom to a designated point on the deck of the barge;

$\lambda$ = angle of list of the barge in port-starboard direction;

$\theta$ = angle of trim of the barge in fore-aft direction.

The above measurements which are made with the barge empty will be subscripted with a zero (i.e., $H_0$, $m_0$, $\lambda_0$, $\theta_0$) while those made after loading will be subscripted with the letter f (i.e., $H_f$, $m_f$, $\lambda_f$, $\theta_f$). The angles of list, $\lambda$, and trim, $\theta$, are measured positive or negative by the following convention. The draft formula developed is insensitive to the sign of the port-starboard list angle, $\lambda$, because of the center line symmetry of the barge. The fore-aft trim angle, $\theta$, is measured positive if the barge is down by the bow, and negative if the barge is up by the bow.

SUMMARY OF RESULTS

The measurement, m, from the overhead horizontal boom to a point on the deck can be made at any point on the deck of the barge. The following general formula for water displaced due to loading the barge is developed with the measurement, m, being made to a point on the deck of the barge which is "a" feet inboard from the port side and "b" feet forward of the stern plane. $\Delta V$ represents the volume of water displaced due to loading. We have $$\Delta V = \frac{w}{2(\tan\rho - \tan\theta_f)} \left( \frac{w^2}{12} \tan^2\lambda_f + \right. \quad (1)$$

-continued $$\left[d+\left(\frac{w}{2}-a\right)\tan\lambda_f - b\tan\theta_f + L\tan\rho - (H_f-m_f)(1+\tan^2\lambda_f+\tan^2\theta_f)^{\frac{1}{2}}\right]^2\Bigg\} - \frac{w}{2(\tan\rho-\tan\theta_0)}\left\{\frac{w^2}{12}\tan^2\lambda_0 + \left[d+\left(\frac{w}{2}-a\right)\tan\lambda_0 - b\tan\theta_0 + L\tan\rho - (H_0-m_0)(1+\tan^2\lambda_0+\tan^2\theta_0)^{\frac{1}{2}}\right]^2\right\}.$$

Once the volume of water displaced due to loading has been calculated from equation (1) above, the tonnage of the payload introduced is found by the formula $$T(\text{tonnage})=\sigma(\Delta V)/2000 \quad (2)$$

where $\tau$ is the weight per cubic foot of the water in which the barge is loaded.

Simplification of Displacement Equation

The point on the deck to which the overhead measurement, m, is made can be chosen to simplify equation (1). If we measure to a point on the deck which is at the stern of the barge and center line port to starboard we have $a=w/2$, $b=0$ and equation (1) simplifies to $$\Delta V = \frac{w}{2(\tan\rho-\tan\theta_f)}\left\{\frac{w^2}{12}\tan^2\lambda_f + [d+L\tan\rho - (H_f-m_f)(1+\tan^2\lambda_f+\tan^2\theta_f)^{\frac{1}{2}}]^2\right\} - \frac{w}{2(\tan\rho-\tan\theta_0)}\left\{\frac{w^2}{12}\tan^2\lambda_0 + [d+L\tan\rho - (H_0-m_0)(1+\tan^2\lambda_0+\tan^2\theta_0)^{\frac{1}{2}}]^2\right\}. \quad (3)$$

A further simplification is possible if we assume the barge is level fore and aft upon completion of loading. In this case we have $\Lambda_f=0°$ and $$\Delta V = \frac{w}{2\tan\rho}\left[d+L\tan\rho-\frac{(H_f-m_f)}{\cos\lambda_f}\right]^2 - \frac{w}{2(\tan\rho-\tan\theta_0)}\left\{\frac{w^2}{12}\tan^2\lambda_0 + [d+L\tan\rho-(H_0-m_0)(1+\tan^2\lambda_0+\tan^2\theta_0)^{\frac{1}{2}}]^2\right\}. \quad (4)$$

Derivation of Displacement Equation

Equation (1) for the change in displacement due to loading the barge was derived by using methods of multiple integration, and the procedure is outlined in this section. A rectangular cartesian coordinate system is established with origin at the keel level of the stern on the port side, with x axis oriented port-starboard, y axis fore-aft and z axis perpendicular to the flat bottom of the barge. The surface of the water at empty condition is described as one plane relative to this coordinate system and the surface of the water at full load condition is described as another plane in this same coordinate system. The change in displacement due to loading is then calculated as the volume bounded by the planes of the two water lines and the planes which form the geometric boundaries of the barge.

If the barge has a port-starboard list angle $\lambda$, and a fore-aft trim angle $\theta$, the equation of the water line plane is given by $$z=x\tan\lambda+y\tan\theta+k \quad (5)$$

where k is some constant to be determined. The vertical distances from the overhead boom to the water surface and to a fixed point on the deck of the barge are given respectively by H and m. Thus $(H-m)$ is the distance from the reference point on the deck of the barge to the water surface. Using the formula for distance from the point (a, b, d) to the water surface $x\tan\lambda+y\tan\theta+k-z=0$, we have $$(H-m)=\frac{|a\tan\lambda+b\tan\theta-d+k|}{(1+\tan^2\lambda+\tan^2\theta)^{\frac{1}{2}}}. \quad (6)$$

Equation (6) can be solved for k and if the result is substituted into equation (5), we find the equation of the water surface to be $$z=(x-a)\tan\lambda+(y-b)\tan\theta+d-(H-m)(1+\tan)^2\lambda+\tan^2\theta)^{\frac{1}{2}}. \quad (7)$$

The equation of the raked end of the barge is given by $$z=(y-L)\tan\rho. \quad (8)$$

The change in displacement due to loading is now calculated by multiple integration. If values $\lambda_0$, $\theta_0$, $H_0$, $m_0$ are used in (7) we have the equation of the empty condition water surface plane, $z_0$. Let $l_0$ be the projection of the intersection of $z_0$ with the raked end of the barge given by (8). We easily find $l_0$ given by the equation $$y=\frac{x\tan\lambda_0+(k_0+L\tan\rho)}{(\tan\rho-\tan\theta_0)}.$$

Similarly we find $l_f$, the projection of the intersection of the full load water surface plane, $z_f$, with the raked end of the barge given by $$y=\frac{x\tan\lambda_f+(k_f+L\tan\rho)}{(\tan\rho-\tan\theta_f)}.$$

Let $R_0$ be the region of the xy plane given by $$0\leqq x\leqq w$$

$$0\leqq y\leqq\frac{x\tan\lambda_0+(k_0+L\tan\rho)}{(\tan\rho-\tan\theta_0)},$$

and $R_1$ be the region given by $$0\leqq x\leqq w$$

-continued $$\frac{x\tan\lambda_0 + (k_0 + L\tan\rho)}{(\tan\rho - \tan\theta_0)} \leq y \leq \frac{x\tan\lambda_f + (k_f + L\tan\rho)}{(\tan\rho - \tan\theta_f)}.$$

The change in displacement due to loading the barge is found to be $$\Delta V = \iint_{R_0} (z_f - z_0)dydx + \iint_{R_1} [z_f - (y - L)\tan\rho]dydx.$$

Evaluation of these integrals yields equation (1).

The attached program for the computer 21 enables it to perform the payload computation which has been mathematically described above and the program is intended to form a part of this application.

It is to be understood that the form of the invention herewith shown and described is to be taken as a preferred example of the same, and that various changes in the shape, size and arrangement of parts may be resorted to, without departing from the spirit of the invention or scope of the subjoined claims.

PROGRAM FOR TI-58C
PROGRAM DESCRIPTION

THIS PROGRAM COMPUTES THE PAYLOAD INTRODUCED INTO A WATER-BORN BARGE OF KNOWN SIZE AND SHAPE. FOUR BARGE DIMENSIONS AND WATER DENSITY ARE OPERATOR INPUT. TWO ANGLES AND TWO MEASUREMENTS ARE INPUT AS DIGITAL DATA BOTH BEFORE LOADING AND AFTER LOADING. THE PROGRAM THEN CALCULATES TOTAL PAYLOAD.

USER INSTRUCTIONS

| STEP | PROCEDURE | ENTER | PRESS | DISPLAY |
|---|---|---|---|---|
| 1 | ENTER BARGE WIDTH IN FEET | WIDTH | A | WIDTH |
| 2 | ENTER BARGE LENGTH IN FEET | LENGTH | B | LENGTH |
| 3 | ENTER BARGE DEPTH IN FEET | DEPTH | C | DEPTH |
| 4 | ENTER RAKE ANGLE IN DEGREES | ANGLE | D | ANGLE |
| 5 | READ AND STORE INITIAL MEASUREMENT IN REGISTERS 05-08 | | | |
| 6 | READ AND STORE FINAL MEASUREMENTS IN REGISTERS 09-12 | | | |
| 7 | ENTER WATER DENSITY (#/FT$^3$) | DENSITY | STO 1 3 | DENSITY |
| 8 | CALCULATE TONNAGE | | E | TONNAGE |

| USER DEFINED KEYS | | DATA REGISTERS (INV List) | | | |
|---|---|---|---|---|---|
| A | STORE WIDTH | 0 | | 10 | FINAL TRIM ANGLE |
| B | STORE LENGTH | 1 | BARGE WIDTH | 11 | BOOM TO WATER (F) |
| C | STORE DEPTH | 2 | BARGE LENGTH | 12 | BOOM TO DECK (F) |
| D | STORE RAKE ANGLE | 3 | BARGE DEPTH | 13 | WATER DENSITY |
| E | COMPUTE TONNAGE | 4 | BARGE RAKE ANGLE | 4 | |
| A' | | 5 | INITIAL LIST ANGLE | 5 | |
| B' | | 6 | INITIAL TRIM ANGLE | 6 | |
| C' | | 7 | BOOM TO WATER (I) | 7 | |
| D' | | 8 | BOOM TO DECK (I) | 8 | |
| E' | | 9 | FINAL LIST ANGLE | 9 | |

FLAGS 0 1 2 3 4 5 6 7 8 9

| LOC | CODE | KEY | COMMENTS | LOC | CODE | KEY | COMMENTS | LOC | CODE | KEY | COMMENTS |
|---|---|---|---|---|---|---|---|---|---|---|---|
| 0 | 76 | LBL | | 55 | 30 | TAN | | 110 | 55 | ÷ | |
| 1 | 11 | A | | 56 | 33 | x$^2$ | | 111 | 01 | 1 | |
| 2 | 42 | STO | | 57 | 85 | + | | 112 | 02 | 2 | |
| 3 | 01 | 01 | | 58 | 53 | ( | | 113 | 65 | × | |
| 4 | 91 | R/S | | 59 | 43 | RCL | | 114 | 43 | RCL | |
| 5 | 76 | LBL | | 60 | 03 | 03 | | 115 | 05 | 05 | |
| 6 | 12 | B | | 61 | 85 | + | | 116 | 30 | TAN | |
| 7 | 42 | STO | | 62 | 43 | RCL | | 117 | 33 | x$^2$ | |
| 8 | 02 | 02 | | 63 | 02 | 02 | | 118 | 85 | + | |
| 9 | 91 | R/S | | 64 | 65 | × | | 119 | 53 | ( | |
| 10 | 76 | LBL | | 65 | 43 | RCL | | 120 | 43 | RCL | |
| 11 | 13 | C | | 66 | 04 | 04 | | 121 | 03 | 03 | |
| 12 | 42 | STO | | 67 | 30 | TAN | | 122 | 85 | + | |
| 13 | 03 | 03 | | 68 | 75 | − | | 123 | 43 | RCL | |
| 14 | 91 | R/S | | 69 | 53 | ( | | 124 | 02 | 02 | |
| 15 | 76 | LBL | | 70 | 43 | RCL | | 125 | 65 | × | |
| 16 | 14 | D | | 71 | 11 | 11 | | 126 | 43 | RCL | |
| 17 | 42 | STO | | 72 | 75 | − | | 127 | 04 | 04 | |
| 18 | 04 | 04 | | 73 | 43 | RCL | | 128 | 30 | TAN | |
| 19 | 91 | R/S | | 74 | 12 | 12 | | 129 | 75 | − | |
| 20 | 76 | LBL | | 75 | 54 | ) | | 130 | 53 | ( | |
| 21 | 15 | E | | 76 | 65 | × | | 131 | 43 | RCL | |
| 22 | 43 | RCL | | 77 | 53 | ( | | 132 | 07 | 07 | |
| 23 | 13 | 13 | | 78 | 01 | 1 | | 133 | 75 | − | |
| 24 | 65 | × | | 79 | 85 | + | | 134 | 43 | RCL | |
| 25 | 43 | RCL | | 80 | 43 | RCL | | 135 | 08 | 08 | |
| 26 | 01 | 01 | | 81 | 09 | 09 | | 136 | 54 | ) | |
| 27 | 55 | ÷ | | 82 | 30 | TAN | | 137 | 65 | × | |
| 28 | 04 | 4 | | 83 | 33 | x$^2$ | | 138 | 53 | ( | |

-continued

| | | | | | | | | |
|---|---|---|---|---|---|---|---|---|
| 29 | 00 | 0 | 84 | 85 | + | 139 | 01 | 1 |
| 30 | 00 | 0 | 85 | 43 | RCL | 140 | 85 | + |
| 31 | 00 | 0 | 86 | 10 | 10 | 141 | 43 | RCL |
| 32 | 65 | × | 87 | 30 | TAN | 142 | 05 | 05 |
| 33 | 53 | ( | 88 | 33 | $x^2$ | 143 | 30 | TAN |
| 34 | 53 | ( | 89 | 54 | ) | 144 | 33 | $x^2$ |
| 35 | 43 | RCL | 90 | 34 | $\sqrt{x}$ | 145 | 85 | + |
| 36 | 04 | 04 | 91 | 54 | ) | 146 | 43 | RCL |
| 37 | 30 | TAN | 92 | 33 | $x^2$ | 147 | 06 | 06 |
| 38 | 75 | − | 93 | 54 | ) | 148 | 30 | TAN |
| 39 | 43 | RCL | 94 | 75 | − | 149 | 33 | $x^2$ |
| 40 | 10 | 10 | 95 | 53 | ( | 150 | 54 | ) |
| 41 | 30 | TAN | 96 | 43 | RCL | 151 | 34 | $\sqrt{x}$ |
| 42 | 54 | ) | 97 | 04 | 04 | 152 | 54 | ) |
| 43 | 35 | 1/x | 98 | 30 | TAN | 153 | 33 | $x^2$ |
| 44 | 65 | × | 99 | 75 | − | 154 | 54 | ) |
| 45 | 53 | ( | 100 | 43 | RCL | 155 | 54 | ) |
| 46 | 43 | RCL | 101 | 06 | 06 | 156 | 95 | = |
| 47 | 01 | 01 | 102 | 30 | TAN | 157 | 91 | R/S |
| 48 | 33 | $x^2$ | 103 | 54 | ) | 8 | | |
| 49 | 55 | ÷ | 104 | 35 | 1/x | 9 | | |
| 50 | 01 | 1 | 105 | 65 | × | | | |
| 51 | 02 | 2 | 106 | 53 | ( | | | |
| 52 | 65 | × | 107 | 43 | RCL | | | |
| 53 | 43 | RCL | 108 | 01 | 01 | | | |
| 54 | 09 | 09 | 109 | 33 | $x^2$ | | | |

I claim:

1. In a weighing system for water borne vessels to enable an accurate determination of the weight of material loaded on a vessel, a floating vessel body portion adapted to receive material from a loading means, a list angle sensor fixed on said body portion and operable to measure the list angle of the vessel before and after loading with material and to provide list angle indications proportional to the degree of list before and after loading, a trim angle sensor fixed on said body portion and operable to measure the trim angle of the vessel before and after loading with material and to provide trim angle indications proportional to the degree of trim before and after loading, and a linear distance measuring device positioned above said body portion at a fixed reference point relative to the body portion and adapted to measure the distance from said reference point to the level of water in which the body portion is floating and to measure the distance from the reference point to a fixed point on the body portion before and after loading a weight measuring means connected to said list angle sensor, trim angle sensor and linear measuring means for accurately determining the weight of material loaded on said vessel.

2. In a weighing system for water borne vessels as defined in claim 1, and said list angle sensor and trim angle sensor each comprising an electrical sensor adapted to produce an electrical signal proportional to the degree of list and the degree of trim of the body portion before and after loading with material, and said linear distance measuring device comprising an extensible distance measuring element fixed to an overhead material delivery means for the vessel.

* * * * *